A. SAUNDERS.
CHUCKS FOR METAL LATHES.
No. 185,838. Patented Jan. 2, 1877.
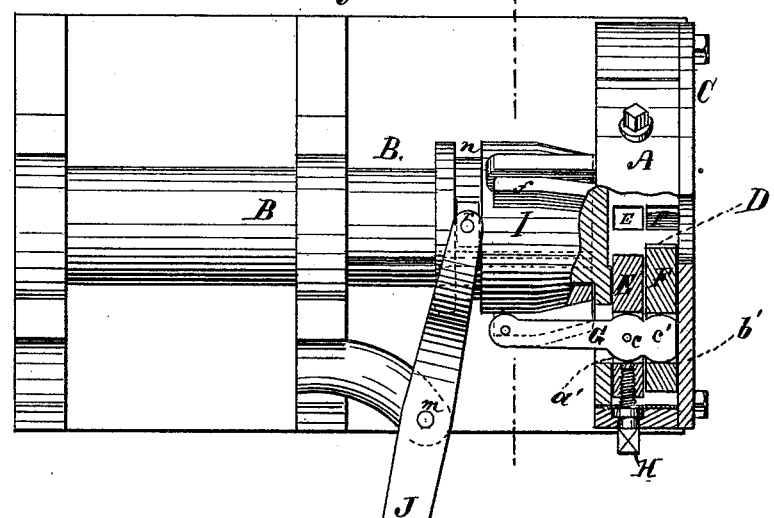
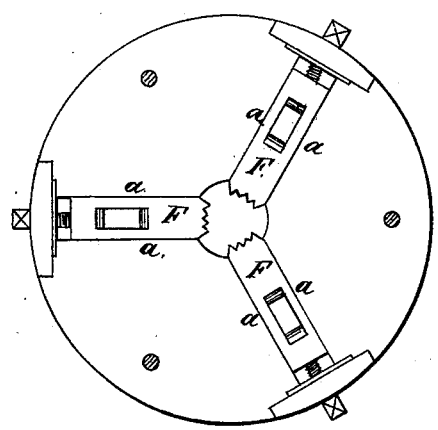
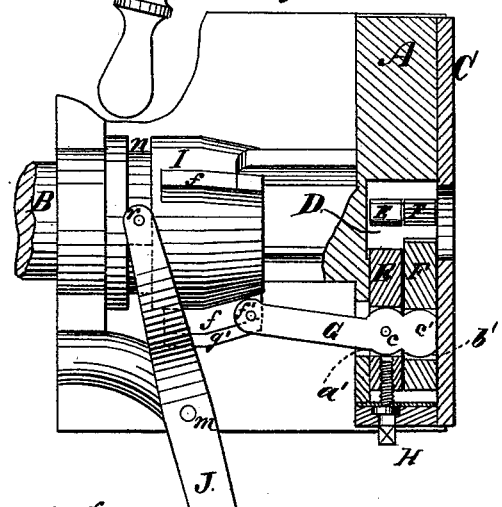
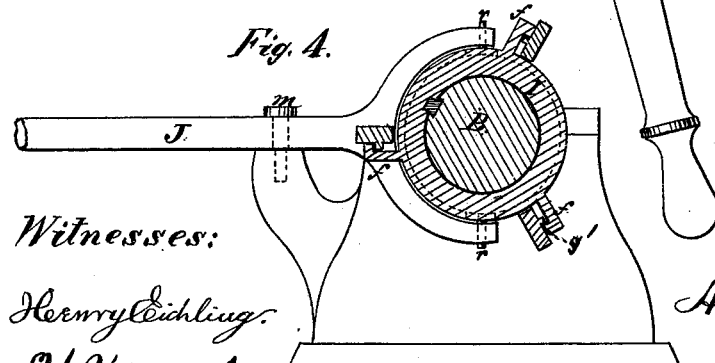
Witnesses:
Henry Eichling
H Wells Jr
Inventor:
Alexander Saunders
per James A Whitney
Atty.

UNITED STATES PATENT OFFICE.

ALEXANDER SAUNDERS, OF YONKERS, NEW YORK, ASSIGNOR TO D. SAUNDERS' SONS, OF SAME PLACE.

IMPROVEMENT IN CHUCKS FOR METAL-LATHES.

Specification forming part of Letters Patent No. 185,838, dated January 2, 1877; application filed November 23, 1876.

*To all whom it may concern:*

Be it known that I, ALEXANDER SAUNDERS, of Yonkers, in the county of Westchester and State of New York, have invented an Improvement in Lathe-Chucks, of which the following is a specification:

This invention relates to that variety of chucks used upon lathes, screw-machines, and the like, for holding cylindric or round rods, pipes, &c.; and the object of the invention is to provide a radial or universal chuck, the griping-jaws of which are capable of adjustment apart from the radial inward and outward movement by which the rod or pipe, as the case may be, is griped or loosened in the use and operation of the chuck, in order that the chuck may be fitted for any given diameter of pipe or rod, and then in the use and operation of the apparatus be moved radially to the requisite degree to gripe and loosen, as occasion requires, the said griping-jaws from the pipe or rod without stopping the rotation of the chuck, by which means the chuck is adapted to a wide variety of work, and by which, furthermore, a great economy of time and labor is secured, inasmuch as that ordinarily lost or involved in the stoppage of the chuck to release the pipe or rod is saved.

To this end the invention comprises a novel combination of the following parts: blocks arranged to slide radially in the head of the chuck and radially adjustable by means of screws; griping-jaws capable of radial movement upon the faces of the just-described sliding blocks; a system of actuating-levers fulcrumed in the sliding blocks aforesaid, and connected with the sliding griping-jaws to give movement thereto, an actuating-block arranged to slide upon the shaft or axle of the chuck, and constructed with a tapering or inclined surface arranged to operate the fulcrumed levers aforesaid by the sliding movement of the aforesaid block, and an operating-lever arranged to give such longitudinal or sliding movement to said block, the whole being combined in such relation with each other as to secure the results and advantages hereinbefore set forth.

Figure 1 is a plan view and partial horizontal section of a chuck made according to my invention. Fig. 2 is a face view of the chuck with its face-plate removed, to show the arrangement of some of the internal parts. Fig. 3 is a side view and partial longitudinal section of the same; and Fig. 4 is a transverse vertical section taken in the line X of Fig. 1.

A is the head of the chuck attached by bolts or in any suitable manner to the extremity of the shaft or axle B. C is the face-plate attached to the front of the chuck in the usual or any proper way. D is the circular central opening or throat of the chuck from which radiate three straight guides, $a$, formed, of course, in the front or face of the body A. These guides $a$ are of a sufficient depth to contain the radially-adjustable blocks E, and the radially-sliding griping-jaws F, the latter being placed upon the front of the former, as represented in Figs. 1 and 2. Each one of this system of radially-adjustable blocks E is slotted, as represented at $a'$, and in this slot is pivoted a lever, G, as shown at $c$. The forward or outer extremity $c'$ of each of these levers G is formed with rounded sides, as shown in Figs. 1 and 3, just mentioned, the said extremity $c'$ extending into a slot, $b'$, formed in the contiguous griping-jaw F. It will be seen that the block E being held stationary, a movement of the lever G upon its fulcrum $c$ will give a radial movement to the jaw F. Each of the blocks E is adjusted radially to any desired extent by means of a screw, H, having its bearing formed in the circumferential portion of the head A, and working in a nut formed in the adjacent outer end of the block E. I is a sliding block, which is made tapering, as represented in Figs. 1 and 3—that is to say, with an inclined surface smallest at its forward or outer end, and upon this inclined surface rest the rearmost or long arms of the levers G, so that by pushing this block I toward the head A, said long arms will be moved radially outward to move the griping-jaws F radially inward toward the central opening or throat of the chuck. Upon the periphery of this sliding block I are provided longitudinal feathers $f$, each constructed with a lateral rib or flange, $g'$. The rearmost extremity of each of the long arms of the levers G rests against one side of these feathers $f$, and has a laterally-projecting pin, $f'$, extending under the flange $g'$ of said feather, the said flange being inclined in a position parallel with the adjacent tapering surface of the block I. When the block I, therefore, is moved in a reverse direction—that is to say, away from the head A—the flange $g'$, acting upon the pin $f'$, will cause the outer or rear extremities of the levers G to be moved radially inward, thereby moving the jaws F radially outward. The block I is caused to rotate with the shaft of the head A, on which it is placed by means of a suitable groove and spline, so that the movement of the head A is simultaneous with that of the sliding block I. J is an operating-lever, the pivot or fulcrum of which is indicated at $m$, and the inner end of which is forked, as shown in Fig. 4, to straddle the outer end of the block I, and in this outer end of said block I is provided a circumferential groove, $n$. A pin, $r$, is provided in each of the two arms of the forked inner end of the lever I, and extends into the groove $n$, so that by moving the outer arm of the lever J in one direction a sliding movement in an opposite direction will be given to the block I. In order to adjust the apparatus for use in holding any given diameter of pipe or tube, the screws H are turned to move the system of sliding blocks E inward or outward, as the case may be, to any desired extent, this bringing the fulcrum $c$ of the levers G at the requisite distance from the axial line of the head A. This being done it is only necessary to move the block I inward by means of the lever J to cause a movement of the griping-jaws F upon the blocks E, adjusted as just set forth to gripe the pipe or tube thrust into the throat D of the chuck, the chuck being, by the means herein set forth, made capable of previous adjustment to suit the requirements of any given diameter of pipe or rod, so that only a very slight movement of the jaws F is required to cause them to gripe and hold such pipe or rod, this arrangement, moreover, permitting the pipe or rod to be repeatedly and alternately griped and released, as occasion may require, without stopping the rotary movement of the chuck, the small movement requisite in the jaws F to gripe or release the same causing the pipe or rod to remain substantially axial to the apparatus, which would be impossible if the movement of the jaws F was as great as would be necessary if reliance upon the griping and releasing movement of the jaws was relied upon, in order to fit it to different sizes of pipe or tube.

What I claim as my invention is—

In a radial or universal chuck the system of levers G fulcrumed in the sliding blocks E, which are made adjustable by screws H, in combination with the system of griping-jaws F, the sliding actuating-block I, and the operating-lever J, the whole constructed, combined, and arranged for use and operation substantially as and for the purpose herein set forth.

ALEX. SAUNDERS.

Witnesses:
EDWARD HOLLY,
HENRY EICHLING.